(12) United States Patent
Miyatake (10) Patent No.: US 6,196,461 B1
(45) Date of Patent: Mar. 6, 2001

(54) VALUE DATA CHARGING METHOD AND SYSTEM FOR IMPLEMENTING THE SAME

(75) Inventor: Manabu Miyatake, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/217,076

(22) Filed: Dec. 21, 1998

(30) Foreign Application Priority Data

Dec. 24, 1997 (JP) .................................................. 9-354374

(51) Int. Cl.$^7$ ...................................................... G06K 5/00
(52) U.S. Cl. ............................ 235/380; 235/379; 902/26; 380/24
(58) Field of Search .................................. 235/380, 379, 235/382; 902/1, 2, 26; 380/24, 30

(56) References Cited

U.S. PATENT DOCUMENTS

| 4,766,293 | * | 8/1988 | Boston | 235/379 |
| 4,992,646 | * | 2/1991 | Collin | 235/375 |
| 5,521,362 | * | 5/1996 | Powers | 235/380 |
| 5,521,363 | * | 5/1996 | Tannenbaum | 235/375 |
| 5,767,504 | * | 6/1998 | Menconi | 235/492 |

FOREIGN PATENT DOCUMENTS

| 9-102002 | 4/1997 | (JP) . |
| 9-167278 | 6/1997 | (JP) . |
| 9-251555 | 9/1997 | (JP) . |

* cited by examiner

*Primary Examiner*—Thien M. Le
*Assistant Examiner*—Daniel St. Cyr
(74) *Attorney, Agent, or Firm*—Mattingly, Stanger & Malur, P.C.

(57) ABSTRACT

A value charging apparatus for writing value data to an electronic storage device includes an apparatus main body having a processor, a cash inserting portion for accepting cash, and an interface through which the value charging apparatus communicates with an electronic storage device and a count unit, the count unit being removably attached to the apparatus main body for storing therein upper limit value data representing an upper limit of an amount which can be charged in value information stored in the electronic storage device. The processor of the apparatus main body executes, in accordance with the result of comparison of an amount which a user intends to charge in the count unit with the upper limit value data, when it is judges that charging amount is within the range of the upper limit value data, the processing of adding the charging value data to value information of the electronic storage device.

15 Claims, 4 Drawing Sheets

VALUE DATA CHARGING METHOD AND SYSTEM FOR IMPLEMENTING THE SAME

BACKGROUND OF THE INVENTION

The present invention relates in general to a value data charging apparatus for charging value data in an electronic storage device for holding therein value data having the value in cash, and more particularly to the technology which is effective for application to a value data charging apparatus which is suitable for enhancement of security against robbery and unfair use of a value charging apparatus in a stored fare card system utilizing IC cards.

In recent years, there have been made fit for practical use more and more electronic money systems utilizing electronic storage devices such as IC cards, and stored fare card systems using stored fare cards in which the prepaid value information effective for only certain traders is stored. In this sort of system, a value data charging apparatus for writing value data to an electronic storage device such as an electronic money card or a stored fare card can produce cash in the form of electronic data from the nothing state by writing the value data to the electronic storage device to which no value data is written at all.

As for the technology relating to such a stored fare card system, in JP-A-9-251555 for example, there is disclosed an information storage device and an automatic ticket examining machine employing the same in which an information recording device such as an IC card has communication ticket data and stored fare data recorded therein, and by which the processing time period which is required to reduce the fare out of a section of a communication ticket is shortened. In addition, in JP-A-9-102002, there is disclosed a settlement card which can be used by a user within the limit of the payment-ability of the user of interest and with which a card company can collect surely the price, and an automatic transferring machine for the settlement.

Since the conventional value data charging apparatus for writing value data to a stored fare card can produce cash in the form of electronic data from the nothing state, there arises the problem that there is the possibility that the value data may be added inexhaustibly to the electronic storage device due to robbery or malicious and unfair use of a value charging apparatus.

SUMMARY OF THE INVENTION

In the light of the foregoing, the present invention was made in order to solve the above-mentioned problems associated with the prior art, and it is therefore an object of the present invention to provide the technology by which electronic value data can be prevented from being produced inexhaustibly.

It is another object of the present invention to provide the technology by which security of a value charging apparatus can be enhanced.

According to the present invention, there is provided a value data charging apparatus for writing value data to an electronic storage device, the apparatus including: a main body of the apparatus having a processor, a cash inserting portion for accepting cash, and an interface through which the value data charging apparatus communicates with the electronic storage device and a count unit being; and the count unit removably attached to the apparatus main body for storing therein upper limit value data representing an upper limit of cash which can be charged in the value data stored in the electronic storage device. The processor of the apparatus main body executes the processing of adding, in accordance with the result of comparing an amount which a user intends to charge with the upper limit value data, when it is judged that a charging amount is within the range of the upper limit value data, charging value data to value information of the electronic storage device. In a certain preferred embodiment, the value charging apparatus of the present invention checks, by the processor of the apparatus main body, whether or not the count unit is attached to the apparatus main body, and accepts, when it is judged that the count unit is attached to the apparatus main body, the input of the charging value data representing the amount which is to be charged in the electronic storage device. Then, the processor reads out the upper limit value data from the count unit and compares the inputted charging value data with the upper limit value data which has been read out from the count unit to check whether or not the charging value data is within the range of the upper limit value data. If it is judged that the inputted charging value data is within the range of the upper limit value data, then the processor checks whether or not the electronic storage device is installed in the value charging apparatus and writes, if it is judged that the electronic storage device is installed in the value charging apparatus, the charging value data to the count unit. In accordance therewith, the count unit subtracts a value corresponding to the charging value data from the upper limit value data, and then ciphers the charging value data of the specified amount to transfer the charging value data thus ciphered to the apparatus main body. Then, the processor of the apparatus main body further transfers the charging value data thus transferred thereto to the electronic storage device. Then, the electronic storage device deciphers the charging value data transferred thereto to reproduce the charging value data, and then adds the charging value data thus reproduced to the value information.

In such a way, the value charging processing is executed within the range of the upper limit value data representing the upper limit value of the charging amount, whereby it is possible to prevent the value data from being produced inexhaustibly.

A further understanding of the nature and advantages of the invention herein may be realized by reference to the remaining portions of the specification and the attached drawings.

BRIEF DESCRIPTION OF THE DRAWINGS

The above and other objects as well as advantages of the present invention will become clear by the following description of the preferred embodiments of the present invention with reference to the accompanying drawings, wherein.

DESCRIPTION OF THE PREFERRED EMBODIMENTS

The preferred embodiments of the present invention will hereinafter be described in detail with reference to the accompanying drawings.

Figure 1:
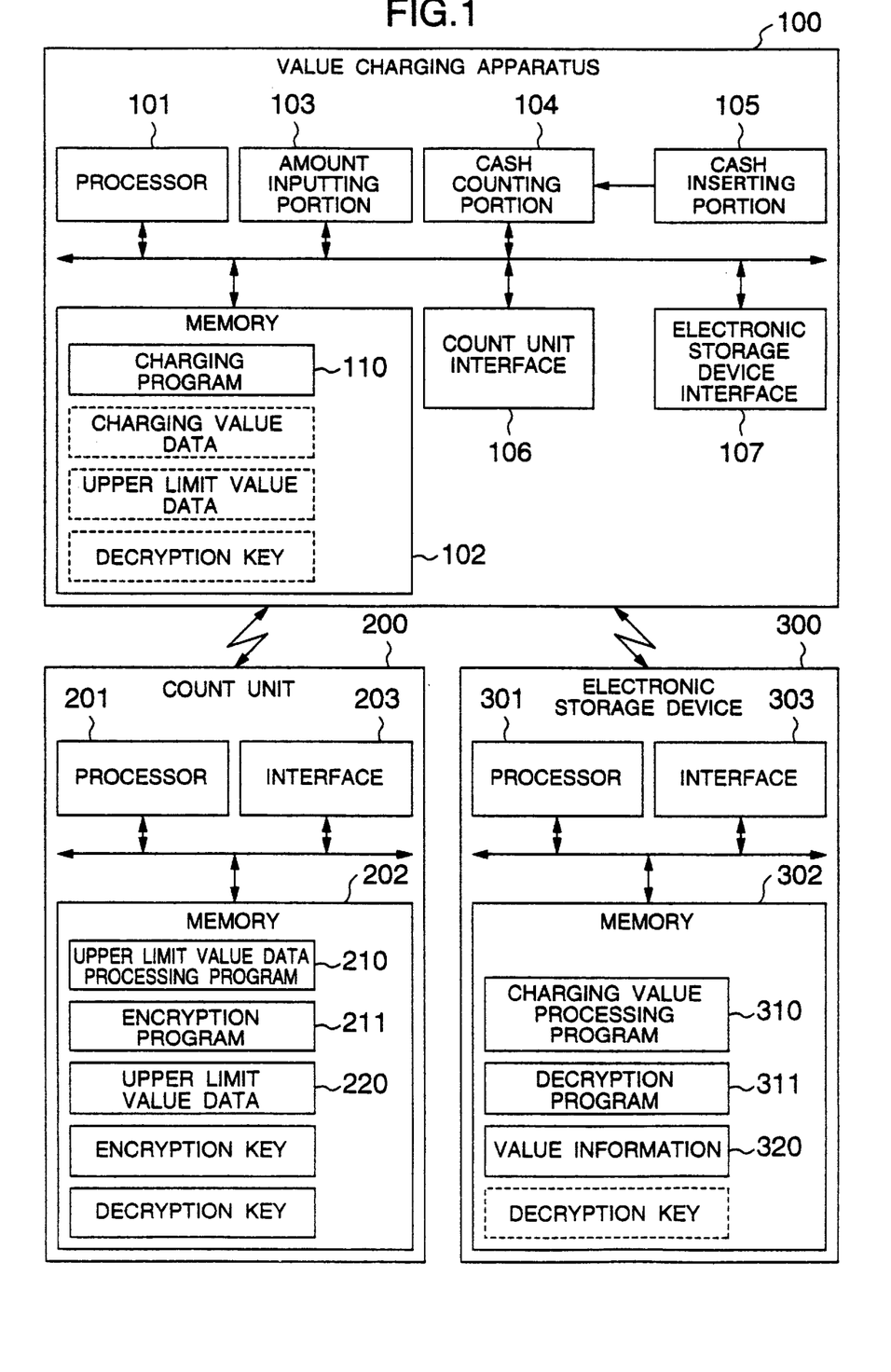
FIG. 1 is a block diagram showing a schematic configuration of an IC card system according to an embodiment of the present invention.

FIG. 1 is a block diagram showing a schematic configuration of an IC card system including a value data charging apparatus according to an embodiment of the present invention. In FIG. 1, reference numeral 100 designates a value charging apparatus, reference numeral 200 designates a count unit, and reference numeral 300 designates an electronic storage device.

The value charging apparatus 100 is the apparatus for storing value data in the electronic storage device 300. Also, the value charging apparatus 100 includes a processor 101, a memory 102, an amount inputting portion 103, a cash counting portion 104, a cash inserting portion 105, a count unit interface 106 and an electronic storage device interface 107. The processor 101 is the processor which serves to control the overall operation of the value charging apparatus 100 and also to execute the processing of comparing charging value data with an upper limit (upper limit value data) which is held in the count unit 200, and the like. The memory 102 is the storage device for storing therein temporarily, in addition to a charging processing program 110 on the basis of which the processing of charging value data in the electronic storage device 300 is executed, the charging value data, a decryption key and an upper limit value data which are necessary in the value charging processing. The amount inputting portion 103 is the portion for inputting therethrough charging value data to the electronic storage device 300. The cash counting portion 104 is the portion for counting the total amount of the cash which has been put into the cash inserting portion 105. The cash inserting portion 105 is the mechanism into which cash such as bills or coins are inserted to be kept therein. The count unit interface 106 is the interface through which the value charging apparatus 100 and the count unit 200 communicate with each other. The electronic storage device interface 107 is the interface through which the value charging apparatus 100 and the electronic storage device 300 communicate with each other. In addition, the charging processing program 110 stored in the memory 102 is the program which serves to check whether or not the charging value data which has been inputted thereto is within the range of the upper limit value data, and also to instruct, when it is judged that the inputted charging value data is within the range of the upper limit value data, the addition of the value information in the electronic storage device 300 and the subtraction of the upper limit value data. The function as the value charging apparatus can be attained by executing the charging processing program 110 by the processor 101. In the present embodiment, as the storage device for storing therein the charging processing program 110, a ROM (Read only Memory) is employed so as to prevent the contents stored therein from being erased even in the event of a cutoff of the power source.

The count unit 200 is the unit for storing therein the upper limit of the value data stored in the electronic storage device 300 and for executing the encryption processing for the charging value data. In this connection, the count unit 200 includes a processor 201, a memory 202, and an interface 203. Also, the count unit 200 is attached or accommodated to or in the value charging apparatus 100. In other words, the count unit 200 is designed in such a way as to be removably attached to the value charging apparatus 100. More specifically, in the present embodiment, the count unit 200 is comprised of an IC card. The processor 201 is the circuit which serves to control the overall operation of the count unit 200 and also to execute the subtraction processing for the upper limit value data 220 and the encryption processing for the value data. The memory 202 is the storage device for storing therein an upper limit data value processing program 210 on the basis of which the processings such as the subtraction of the upper limit value data and the transfer of the charging value data to the value charging apparatus 100 are executed, and an encryption program 211 on the basis of which the encryption processing for the charging value data is executed. In this connection, the memory 202 includes an upper limit value data storage area 220 in which the upper limit value data is stored, an area in which an encryption key is stored and an area in which a decryption key is stored. The interface 203 is the interface through which the value charging apparatus 100 and the count unit 200 communicate with each other. The upper limit value data which is stored in the upper limit value data storage area 220 is the data representing the upper limit of the amount which can be charged in the electronic storage device 300. In addition, the function of the count unit 200 can be realized by executing the upper limit value data processing program 210 and the encryption processing program 211 by the processor 201.

The electronic storage device 300 is utilized in the form of an electronic money card in which the value data of the electronic money is stored, or in the form of a stored fare card in which the prepaid value data effective to only a certain trader is stored. More specifically, the electronic storage device 300 is realized by an IC card including a processor 301, a memory 302, and an interface 303. In this connection, the processor 301 controls the overall operation of the electronic storage device 300, and executes the decryption processing for the charging value data and the addition processing for the value information. The memory 302 stores therein a charging value processing program 310, and a decryption program 311, and also includes a value information storage area in which the value information is stored. The interface 303 is the interface through which the value charging apparatus 100 and the electronic storage device 300 communicate with each other. In addition, the value information which is stored in the value information storage area 320 is the information representing the value data which is employed in the form of the electronic memory or the stored fare information which is stored in the electronic storage device 300. The charging value processing program 310 is the program on the basis of which the processing of adding the charging value data to the value information is executed in accordance with the instruction issued from the value charging apparatus 100. The decryption program 311 is the program on the basis of which the ciphered charging value data is deciphered. The function of the processor 301 such as the decryption processing for the charging value data and the addition processing for the value information is realized by executing the programs associated therewith by the processor 301. In this connection, the electronic storage device 300 is utilized for the payment in the purchase of articles. At this time, in the electronic storage device 300, the value data corresponding to the payment amount is subtracted from the value information on the basis of the processing between another processor (not shown) and the electronic storage device 300.

Figure 2:
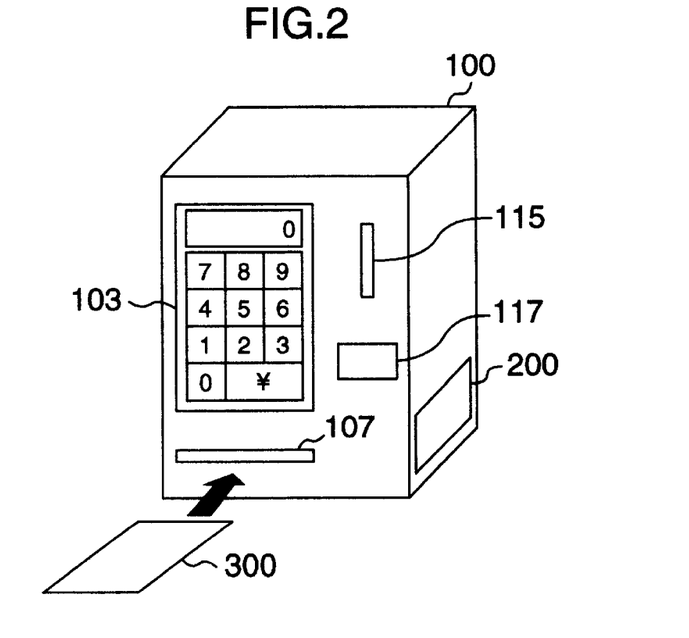
FIG. 2 is an exterior view showing the construction of a value data charging apparatus.

FIG. 2 is an exterior view showing the construction of the value data charging apparatus 100 according to the present embodiment. A user who intends to charge the value data in his/her electronic storage device 300 installs his/her electronic storage device 300 in the electronic storage device interface 107 and then puts cash into the cash inserting portion 105 through a cash inlet port 115. Then, the user inputs the value data through the amount inputting portion 103 to execute the value charging processing. As shown in the figure, the amount inputting portion 103 includes a keyboard through which the value data is inputted, and a display device on which the data relating to the amount corresponding to the value data thus inputted is displayed. In addition, in the figure, reference numeral 117 designates a cash return port through which the cash is returned back to the user when the user interrupts the processing after having put the cash therein, or when it is judged that the charging cannot be carried out on the basis of the value charging processing which will be described later.

Figure 3:
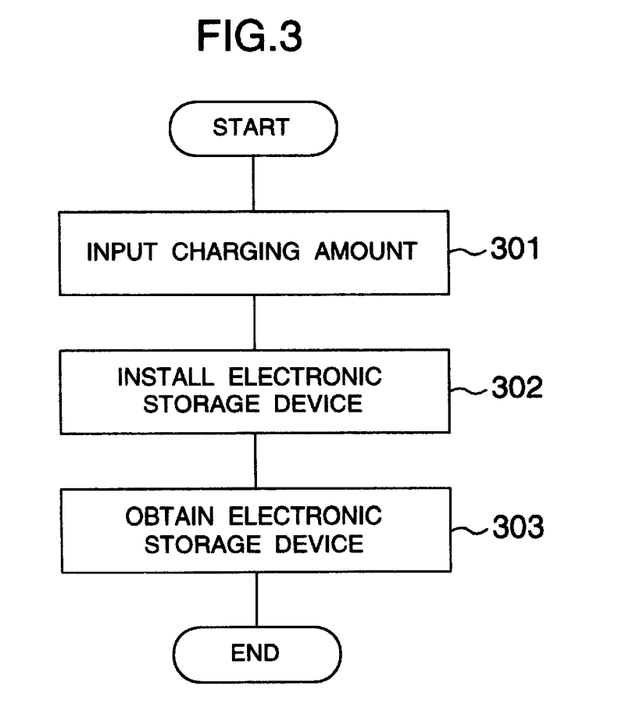
FIG. 3 is a flow chart showing t he procedure of manipulation made by a user who carries out charging of value data.

FIG. 3 is a flow chart useful in explaining the processing procedure of manipulation made by a user who intends to carry out the charging in accordance with the present embodiment. First of all, in Step 301, a user who intends to carry out the charging puts the cash of the amount which is to be charged in the electronic storage device 300 through the cash input port 115 and then inputs the amount which is to be appropriated to the charging within the range of the cash thus put through the amount inputting portion 103. Next, in Step 302, at the time when the user installs the electronic storage device 300 in the electronic storage device interface 107, the value charging processing which will be described later is executed by the value charging apparatus 100. Thereafter, in Step 303, the user obtains the electronic storage device 300 for which the charging has been carried out. In this connection, there may be adopted the procedure wherein when inputting, in the processing in Step 301, through the amount inputting portion 103 the data relating to the charging amount to the value charging apparatus 100 which is connected to the associated financial institution through the communication line in this case, the amount is specified which is appropriated to the charging from his/her balance of the specified account at the associated bank.

Figure 4:
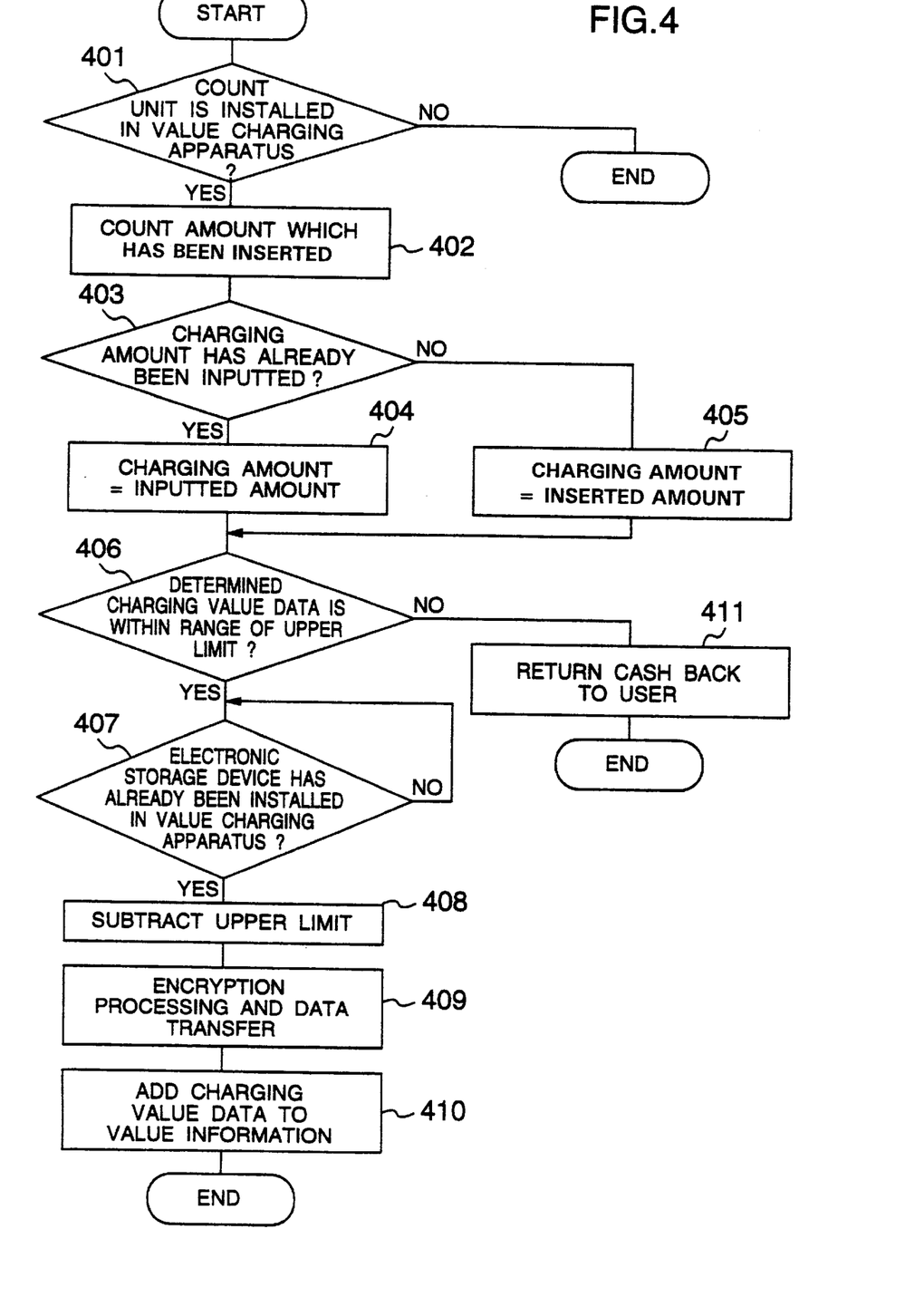
FIG. 4 is a flow chart showing the processing procedure of the charging processing.

FIG. 4 is a flow chart useful in explaining the processing procedure of the charging processing which is executed on the basis of the charging program. This processing is activated by detecting, by the cash inserting portion 105, insertion of the cash thereinto by a user. First of all, in Step 401, the count unit interface 106 communicates with the interface 203 of the count unit 200, whereby the processor 101 of the value charging apparatus 100 checks whether or not the count unit 200 is removably attached to the value charging apparatus 100. If it is judged in Step 401 that the count unit 200 is removably attached to the value charging apparatus 100, then the processing proceeds to Step 402, while if it is judged in Step 401 that the count unit 200 is not removably attached to the value charging apparatus 100, then the value charging processing will be completed. Next, in Step 402, the processor 101 counts the amount of the cash which has been inserted into the cash inserting portion 105 in the cash counting portion 104 so that the processing proceeds to Step 403. In Step 403, it is judged whether or not the input of the specified charging amount has already been carried out through the amount inputting portion 103. If it is judged in Step 403 that the data relating to the specified charging amount has already been inputted through the amount inputting portion 103, then the processing proceeds to Step 404 in which the charging amount thus inputted is determined as the charging amount to the value information which is held by the electronic storage device 300. On the other hand, if it is judged in Step 403 that the data relating to the specified charging amount has not yet been inputted, then the processing proceeds to Step 405 in which the amount which has been counted in Step 402, i.e., the total amount which has been inserted into the cash inserting portion 105 is determined as the charging amount to the value information in the electronic storage device 300. In this connection, in the present embodiment, only for a predetermined time period after the cash has been inserted into the cash inserting portion 105, the specification of the charging amount is accepted. Then, if the input of the charging amount through the amount inputting portion 103 is not carried out for this predetermined time period, then it is judged that the input of the charging amount through the amount inputting portion 103 was not actually carried out.

Next, in Step 406, in order that the processor 101 may check whether or not the charging amount which has been determined in Step 404 or step 405 is within the range of the upper limit value data, the processor 101 reads out the upper limit value data from the count unit 200 to compare the upper limit value data thus read out with the determined charging amount. If it is judged in Step 406 that the determined charging value data is within the range of the upper limit value data, then the processing proceeds to Step 407. On the other hand, if it is judged in Step 406 that the determined charging value data is not within the range of the upper limit value data, then the cash is returned back to a user in Step 411 and then the value charging processing is completed. Then, in Step 407, the processor 101 controls the electronic storage device interface 107 to communicate with the interface 303 of the electronic storage device 300 to check whether or not the electronic storage device 300 has already been installed in the value charging apparatus 100. If it is judged in Step 407 that the electronic storage device 300 has already been installed in the value charging apparatus 100, then the processing proceeds to Step 408. On the other hand, if it is judged in Step 407 that the electronic storage device 300 is not yet installed in the value charging apparatus 100, then the check in Step 404 is repeatedly carried out to wait for the installation of the electronic storage device 300 therein. In this connection, in the case where in Step 407, even when a predetermined time period has elapsed, the electronic storage device 300 is not yet installed in the value charging apparatus 100 as before, the cash may be returned back to the user to complete the processing. After having carried out the above-mentioned check, in Step 408, the processor 101 instructs, through the count unit interface 106, the count unit 200 to transfer the charging value data as well as to carry out the subtraction of the upper limit value data. In response to this instruction, the processor 201 of the count unit 200 subtracts the upper limit value data and ciphers the charging value data which is specified by the encryption program 211. The charging value data thus ciphered is then transferred to the value charging apparatus 100. The processor 101 of the value charging apparatus 100 transfers the ciphered charging value data which has been received from the count unit 200 to the electronic storage device 300 (Step 409). Next, in Step 410, the processor 310 of the electronic storage device 300 executes the processing of adding the charging value data to the value information.

While in the above-mentioned processing, when it is judged in Step 403 that the charging amount has not yet been inputted, the total amount the data of which has been put into the cash putting portion 105 is made the charging amount, there may be adopted the procedure wherein when it is judged in Step 403 that the charging amount has not yet been inputted, the processing is completed on the basis of the assumption that a user has no intention of charging the amount, and then the cash which has been put into the cash inserting portion 105 is returned back to the user.

Figure 5:
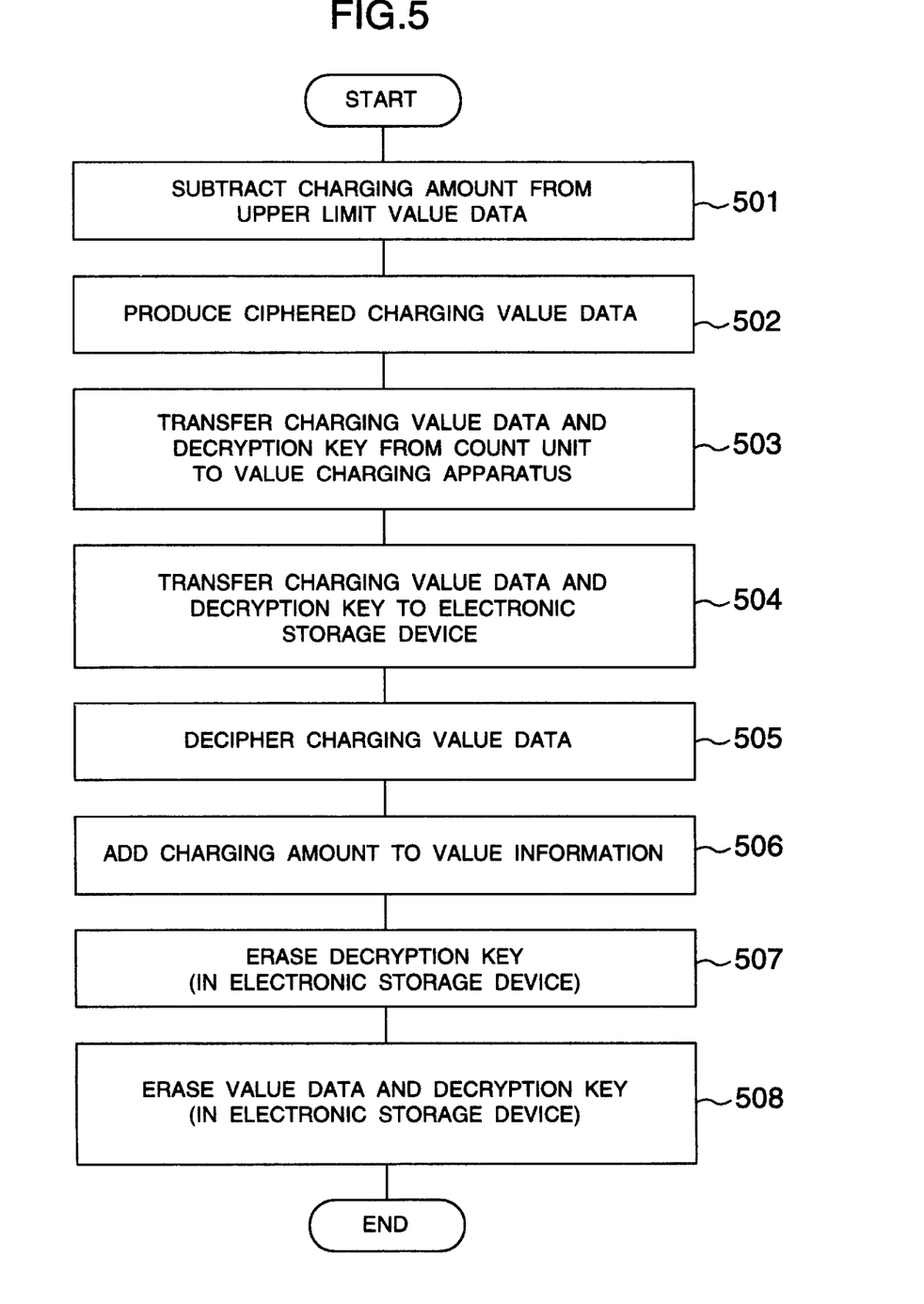
FIG. 5 is a flow chart showing the processing procedure of the processing of writing charging value data.

FIG. 5 is a flow chart useful in explaining the processing procedure of the processing of writing the charging value data. Also, FIG. 5 shows the details of the processings which are executed from Step 408 to Step 410 in FIG. 4. In this case, it is assumed that the charged amount is n, the value of the upper limit value data which is held in the upper limit value data storage area 220 is N, and the value information which is held in the value information storage area 320 of the electronic storage device 300 is X. In the processing which will hereinbelow be described, there is shown the processing procedure in the case where the value n corresponding to the charging amount is subtracted from the value N of the upper limit value data, and the charging amount n is added to the value X of the value information which is held by the electronic storage device 300.

First of all, in Step 501, the processor 101 of the value charging apparatus 100 instructs the count unit 200 to transfer the charging amount n and to subtract the amount corresponding to the charging amount n from the upper limit value data. In response to this instruction issued thereto, the processor 201 of the count unit 200 subtracts the value n corresponding to the charging amount from the value N of the upper limit value data which is stored in the upper limit value data storage area 220 of the memory 202. Next, in Step 502, the processor 201 of the count unit 200 produces the charging value data representing the charging amount n which has been instructed by the value charging apparatus 100, and then ciphers the charging value data thus produced on the basis of the encryption program 211 to produce the ciphered charging value data. In this connection, the encryption program 211 may be designed in such a way that the encryption key is changed every time in order to enhance the security. Next, in Step 503, the processor 201 of the count unit 200 transfers both of the ciphered charging value data and the decryption key which is used to decipher the ciphered charging value data to the value charging apparatus 100 through the interface 203. Then, the processor 101 of the value charging apparatus 100 accepts both of the ciphered charging value data and the decryption key therefor from the count unit 200 and holds temporarily both of the ciphered charging value data and the decryption key therefor, which have been accepted, in the memory 102. Next, in Step 504, the processor 101 transfers both of the ciphered charging value data and the decryption key therefor to the electronic storage device 300 through the electronic storage device interface 107. Next, in Step 505, the processor 301 of the electronic storage device 300 deciphers the ciphered charging value data, which has been transferred thereto from the value charging apparatus 100, using the decryption key therefor to produce the charging value data n. In Step 506, the processor 301 of the electronic storage device 300 adds, on the basis of the charging value processing program 310, the charging value data n to the value information x which is held in the value information storage area 320 to update the value information. Thereafter, in Step 507, the processor 301 erases the decryption key and then informs the value charging apparatus 100 of that the addition processing for the value information has been completed. In response to this information, in Step 508, the processor 101 of the value charging apparatus 100 erases both of the ciphered charging value data which is held in the memory 102 and the decryption key therefor. In this connection, in the case where the value charging processing in the electronic storage device 300 mets with failure due to some cause or other, there may be adopted the procedure wherein the processor 101 of the value charging apparatus 100 sends again both of the charging value data which is held in the memory 102 and the decryption key in order to retry the value charging processing.

When as a result of executing the value charging processing in the value data charging apparatus 100 in a manner as described above, the value of the upper limit value data of the count unit 200 has become "0", no portion of the value data can be charged in the electronic storage device 300 anymore. In this case, the count unit 200 is replaced with the new one, whereby the value charging processing can be reopened. In this connection, for the count unit 200 in which the value of the upper limit value data has become "0", there may be adopted the procedure wherein the specific value is added to the upper limit value data 220 by the upper limit value data processing program 210 to reset the value of the upper limit value data 220 so that the count unit of interest can be utilized again. In addition, there may also be adopted another procedure wherein the value charging processing is not executed until the value of the upper limit value data has become "0", and at the stage wherein the value of the upper limit value data becomes lower than a predetermined value equal to or larger than "0", the execution of the value charging processing is made impossible.

As described above, since in the value data charging apparatus of the present embodiment, the value charging processing is executed in such a way that the charging amount does not exceed the range of the upper limit value data representing the upper limit of the charging amount, it is possible to prevent the value data from being produced inexhaustibly. In addition, in the present embodiment, the upper limit value data, the encryption key, and the decryption key are included in the detachable count unit, and also the encryption processing is executed in the count unit. For this reason, it is difficult to fabricate the ciphered charging value data. In addition, since the function which is required to execute the value charging processing is distributively provided in the main body of the value charging apparatus and the count unit as described above, the value charging apparatus cannot function without the count key. In other words, when executing the value charging processing, the main body of the value charging apparatus only relays the ciphered charging value data from the count unit to the electronic storage device. Therefore, when the value charging apparatus is not used, the main body of the value charging apparatus and the count unit are separately kept, whereby even if the main body of the value charging apparatus is stolen, the algorithm and the encryption key which are used in the encryption processing are not stolen at all, and hence it is possible to enhance the security.

While in the above-mentioned embodiment, the comparison of the charging amount with the upper limit value data and the judgement therefor are carried out on the main body side of the value charging apparatus, for example, there may also be adopted the procedure wherein both of the comparison and the judgement are carried out on the count unit side, and the results thereof are reported to the main body side of the value charging apparatus. The concrete procedure thereof is, for example, as follows. The count unit is informed of the charging amount which has been determined in Step 404 or Step 405. Then, the count unit compares the charging amount thus informed with the upper limit value data. If it is judged by the count unit that the charging amount is within the range of the upper limit value data, then the count unit produces the charging value data to transfer the charging value data thus produced to the apparatus main body. On the other hand, if it is judged by the count unit that the charging amount exceeds the upper limit, then the main body of the value charging apparatus is informed from the count unit that the charging is impossible. In addition, while in the abovementioned embodiment, it is detected that a user puts the cash into the cash inserting portion, thereby activating the charging program, for example, there may also be adopted the procedure wherein the charging program is activated in response to the command input issued from the amount inputting portion, and in Step 402 shown in FIG. 4, the apparatus waits for a user to insert the cash into the cash inserting portion, in order to execute the predetermined processing. In addition, there may also be adopted the procedure wherein after completion of the value charging processing, the upper limit value data is checked, and if it is judged that the upper limit value data of interest becomes equal to or smaller than a predetermined value, then the subsequent utilization by a user is stopped. As described above, it will be understood that the present invention is not limited to the above-mentioned embodiments, and hence various kinds of changes and modifications will occur to those skilled in the art without departing from the subject matter of the invention.

What is claimed is:

1. A method of charging value data for use in a value charging apparatus for writing value data to an electronic storage device in which charging of value data in value information stored therein is possible, said method comprising the steps of:

inputting charging value data representing an amount to be charged to said electronic storage device;

holding upper limit value data representing an upper limit of chargeable value data and reading out the upper limit value data from a count unit which is removably attached to said value charging apparatus;

comparing the charging value data with the upper limit value data; and subtracting, when the charging value data is within the range of the upper limit value data, the charging value data from the upper limit value data and also adding the charging value data to value information in said electronic storage device.

2. A value charging method according to claim 1, wherein said step of carrying out the subtraction and the addition includes the step of ciphering the charging value data in said count unit to transfer the ciphered charging value data to said value charging apparatus, and the step of transferring the ciphered charging value data from said value charging apparatus to said electronic storage device.

3. An IC card system comprising:

an IC card having stored value information; a value charging apparatus for writing value data to said IC card, said apparatus including a count unit removably attached to a main body of the apparatus for holding upper limit value data representing an upper limit of an amount which is permitted to be charged in said electronic storage device, charging program means for instructing, when charging value data representing an amount to be charged in said electronic storage device is within the range of the upper limit value data, subtraction of the upper limit value data and addition of value information which is stored by said IC card, and upper limit value data processing program means for subtracting, in response to the instruction issued thereto from said charging program means, the charging value data from the upper limit value data; and charging value processing program means provided in said IC card for adding, in response to an instruction issued thereto from said charging program means, the charging value data to the value information.

4. An IC card system according to claim 3, wherein said count unit includes encryption program means for ciphering the charging value data to transmit the charging value data thus ciphered to said charging value processing program means, and said charging value processing program means instructs addition of the value information using the ciphered charging value data.

5. An IC card system according to claim 4, wherein said IC card includes means for deciphering the ciphered charging value data.

6. A value charging apparatus for writing value data to an electronic storage device in which charging of value data in value information stored therein is possible, said apparatus comprising:

a main body, including processing means for executing the processing of charging the value data in said electronic storage device, a first interface through which data is transferred between a count unit and said value charging apparatus, and a second interface through which data is transferred between said electronic storage device and said value charging apparatus;

wherein said count unit is removably attached to said main body for holding upper limit value data representing an upper limit of an amount which is permitted to be charged in said electronic storage device, and wherein said processing means executed, in response to a result of comparison of an amount which a user intends to charge with an upper limit value data, when the charging amount is within the range of the upper limit value data, the processing of adding the charging value data to value information of said electronic storage device.

7. A value charging apparatus according to claim 6, wherein said count unit includes means for receiving specification of a charging amount through said first interface to produce charging value data of the specified amount, and means for ciphering the produced charging value data to transfer the ciphered charging data to said first interface.

8. A value charging apparatus according to claim 7, wherein said main body includes memory means for holding therein the ciphered charging value data, and said processing means retries, when the value charging processing in said electronic storage device has failed, the value charging processing using the ciphered charging value data which is held by said memory means.

9. For use in a value charging apparatus for writing value data to an electronic storage device in which charging of value data in value information stored therein is possible, said apparatus including a main body having processing means for executing the processing of charging value data in said electronic storage device and a count unit removably attached to said main body for holding therein upper limit value data representing an upper limit of an amount which is permitted to be charged in said electronic storage device, a method of charging value data comprising the steps of:

accepting insertion of cash from a user at said main body;

determining an amount to be charged within the range of the cash thus accepted;

instructing said count unit to accept the charging amount thus determined;

producing charging value data corresponding to the charging amount specified by the instruction at said count unit;

transferring the charging value data thus produced to said main body; and transferring the charging value data to said electronic storage device by said processing means to carry out charging of the value data in the value information.

10. A value data charging method according to claim 9, wherein said step of producing the charging value data includes the step of ciphering the produced charging value data to transfer the produced charging value data thus ciphered to said main body.

11. A value data charging method according to claim 10, wherein said transfer step includes the step of transferring a decryption key, which is used to decipher the ciphered charging value data, together with the ciphered charging value data.

12. A value data charging method according to claim 11, wherein said step of charging the value data includes the step of holding in memory means both of the ciphered charging value data which has been transferred from said count unit and the decryption key therefor.

13. A value data charging method according to claim 12, wherein said step of charging the value data includes the step of reexecuting, when charging of the value data in said electronic storage device has failed, said value data charging step on the basis of both of the ciphered charging value data which is held in said memory means and the decryption key therefor.

14. A value data charging method according to claim 9, wherein said step of determining the charging amount includes the step of receiving the specification of the amount which is intended to be charged from a user to determine the specified amount as the amount to be charged.

15. A value data charging method according to claim 14, wherein said step of determining the amount to be charged includes the step of determining, when the specification of the amount is not carried out, the amount of cash, which has been inserted thereinto, as the amount to be charged.

* * * * *